(12) United States Patent
Hsu

(10) Patent No.: US 6,412,404 B1
(45) Date of Patent: Jul. 2, 2002

(54) JUICE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/077,844

(22) Filed: Feb. 20, 2002

(51) Int. Cl.[7] .............. A23N 1/00; A23N 1/02; A47J 43/046; A47J 43/07; A23L 1/00
(52) U.S. Cl. .............. 99/495; 99/511; 99/513; 366/314; 366/601
(58) Field of Search .............. 99/492, 509–513, 99/340; 366/291, 297–300, 314, 601; 241/37.5, 92, 282.1, 282.2, 101.01, 101.2; 494/36, 37, 43, 47, 85, 10; 426/61, 63, 49, 52, 533, 599, 640, 231, 233

(56) References Cited

U.S. PATENT DOCUMENTS

| | | | | |
|---|---|---|---|---|
| 4,297,038 A | * | 10/1981 | Falkenbach | 366/601 X |
| 4,350,087 A | * | 9/1982 | Ramirez | 99/513 X |
| 4,506,601 A | * | 3/1985 | Ramirez et al. | 99/511 |
| 4,614,153 A | * | 9/1986 | Kurome et al. | 99/513 X |
| 4,681,031 A | * | 7/1987 | Austad | 99/511 |
| 4,700,621 A | * | 10/1987 | Elger | 99/513 X |
| 4,716,823 A | * | 1/1988 | Capdevila | 99/510 X |
| 4,941,403 A | * | 7/1990 | Cimenti | 99/492 X |
| 5,355,784 A | * | 10/1994 | Franklin et al. | 99/492 |
| 5,479,851 A | * | 1/1996 | McClean et al. | 210/360.1 X |
| 5,495,795 A | * | 3/1996 | Harrison et al. | 241/37.5 X |
| 5,852,968 A | * | 12/1998 | Sundquist | 366/314 X |
| 5,934,179 A | * | 8/1999 | Schmid et al. | 99/492 X |

* cited by examiner

Primary Examiner—Timothy F. Simone
(74) Attorney, Agent, or Firm—Rosenberg, Klein & Lee

(57) ABSTRACT

A juice maker comprises a jar and a tray at a bottom portion of the jar, the tray comprising an opening at one end, and is characterized in that:

the jar comprising a recess at one side, a hole at a bottom portion close to the recess, an axle adjacent to the hole; the tray comprising an opening at one end and a sleeve at the other end opposing to the opening, the opposing end with respect to the opening of said tray is attached closely to the hole, thus, the tray may be pivoted into the recess of the jar when not in use, and the tray may be pivoted outwardly from the recess to drain the juice in the jar.

4 Claims, 4 Drawing Sheets

JUICE MAKER

BACKGROUND OF THE INVENTION

1. Field of the Invention

This invention relates to a juice maker, and more particularly to a juice maker having a rotary tray that may be hidden in the juice maker when not in use, so the opening of the tray will not exposure outside.

2. Description of the Prior Art

Conventional juice makers on the market are mostly using a hole at the bottom of the jar to drain out juice. But in many times, the juice comes out to from the tray, unevenly and irregularly, which may even come out along the edge of the tray, which attracts fly and causes sanitary problem when not in use.

SUMMARY OF THE INVENTION

It is the primary object of the present invention to provide a juice maker, which comprises a rotary tray that may be hidden in the maker when not in use, and turned outwardly from the juice maker to drain juice.

It is another object of the present invention to provide a juice maker, which is healthy design to users.

It is a further object of the present invention to provide a juice maker, which is easy to operate.

DETAILED DESCRIPTION OF THE PREFERRED EMBODIMENT

Figure 1:
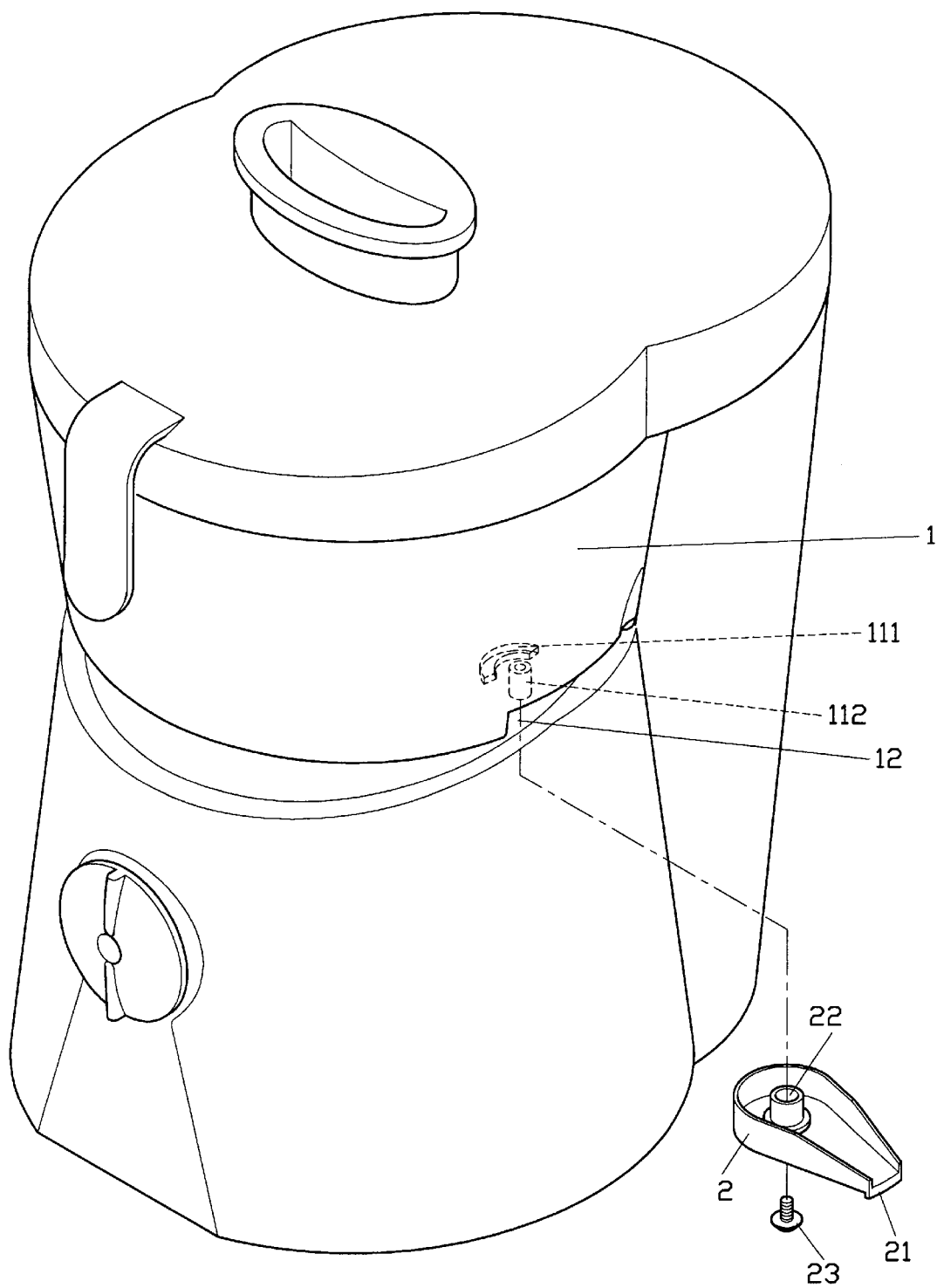
FIG. 1 is a perspective view of the present invention, with a tray disengaged from the juice maker.
Figure 2:
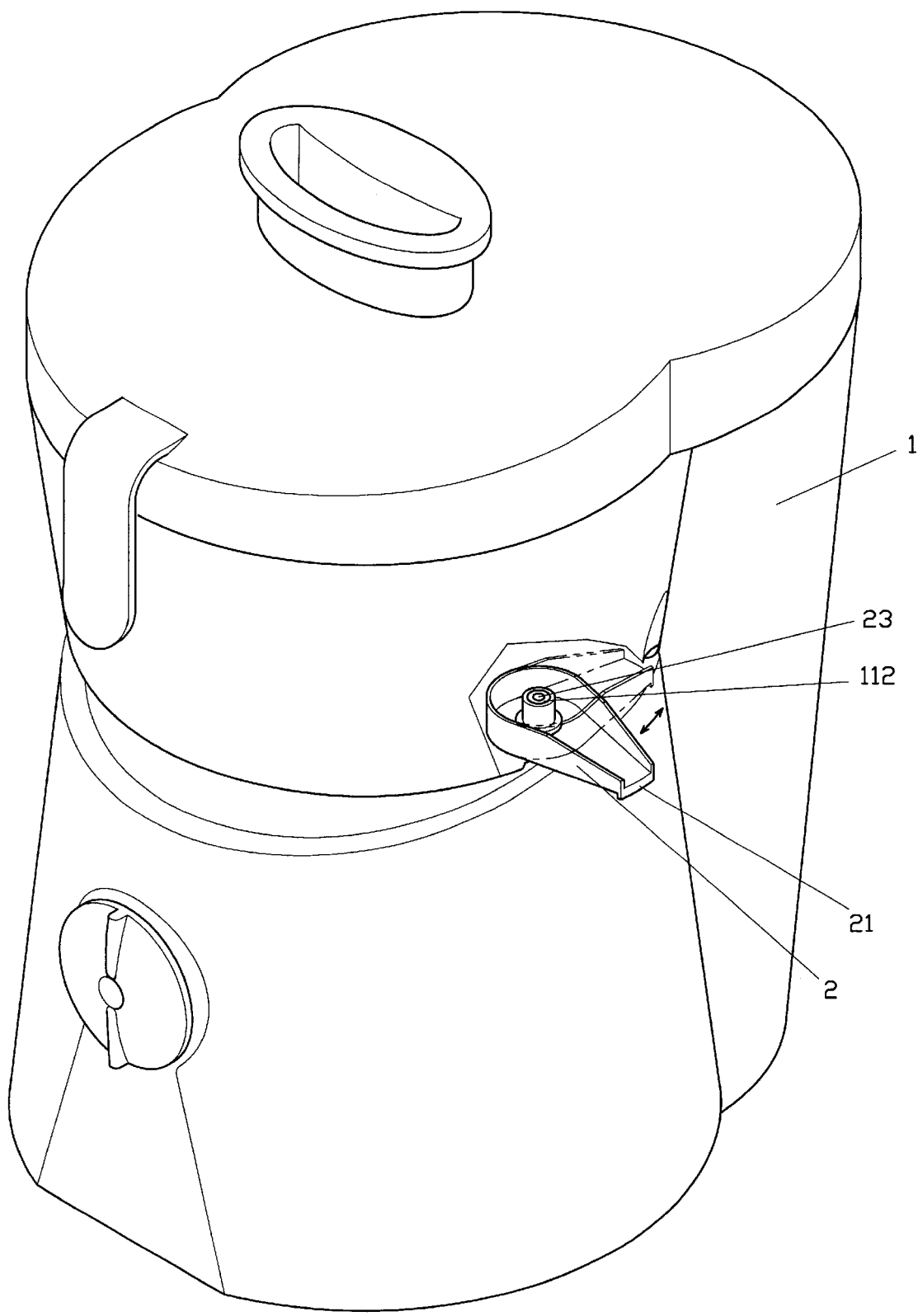
FIG. 2 is a perspective view of the present invention.
Figure 3:
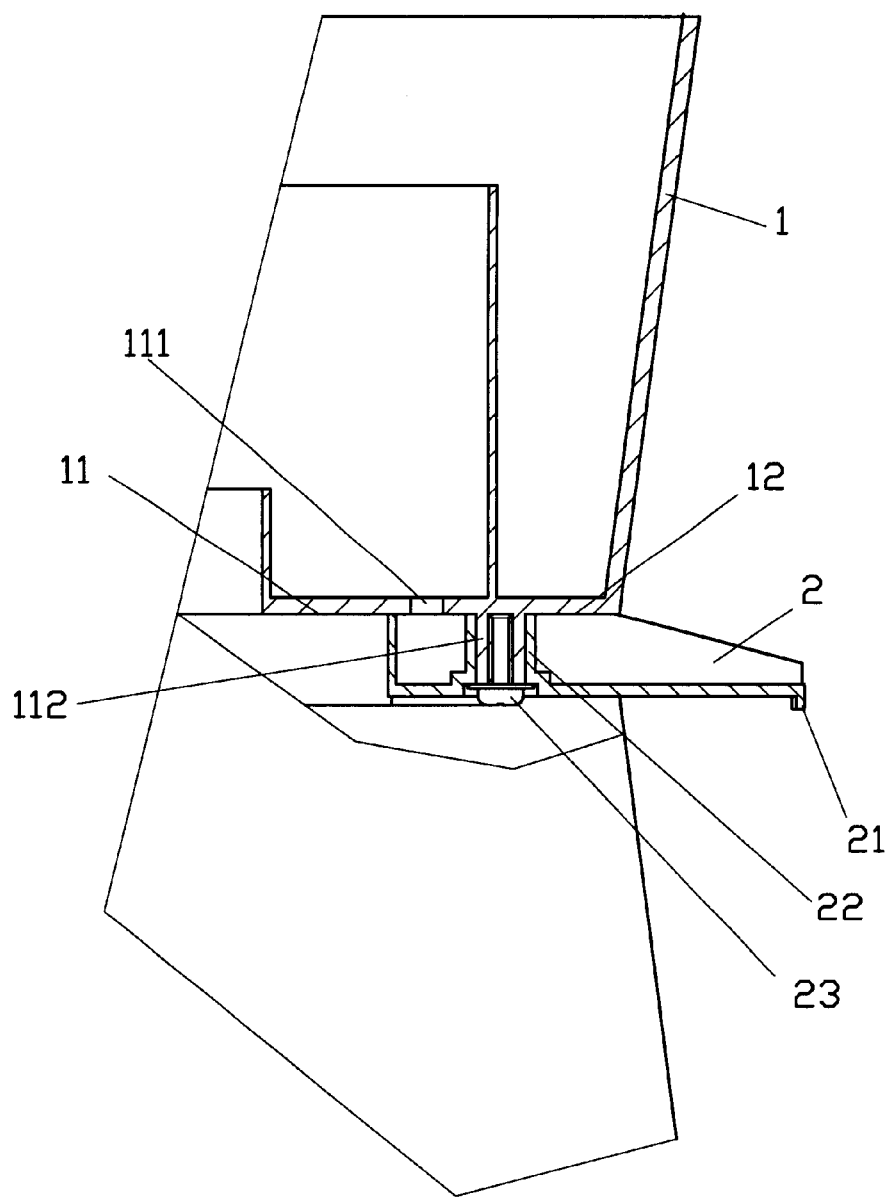
FIG. 3 is a is a sectioned view of the tray of the present invention.

Reference is now made to FIGS. 1 through 3, wherein the juice maker of the present invention comprises a jar 1 having an aucuate hole 111 at a bottom portion 11, and a tray 2 extending from the arcuate hole 111 with an opening 21 at one end.

The jar 1 comprises a recess 12 at one side, an axle 112 formed in the jar 1 close to the arcuate hole 111.

The tray 2 comprises a sleeve 22 at the opposing end of an opening 21, and is adapted to be sleeved on the axle 112 of the jar 1, and secured by a screw 23 to the jar 1. The inner side of the tray opposite to the opening 21 is underneath the arcuate hole 111.

Figure 4:
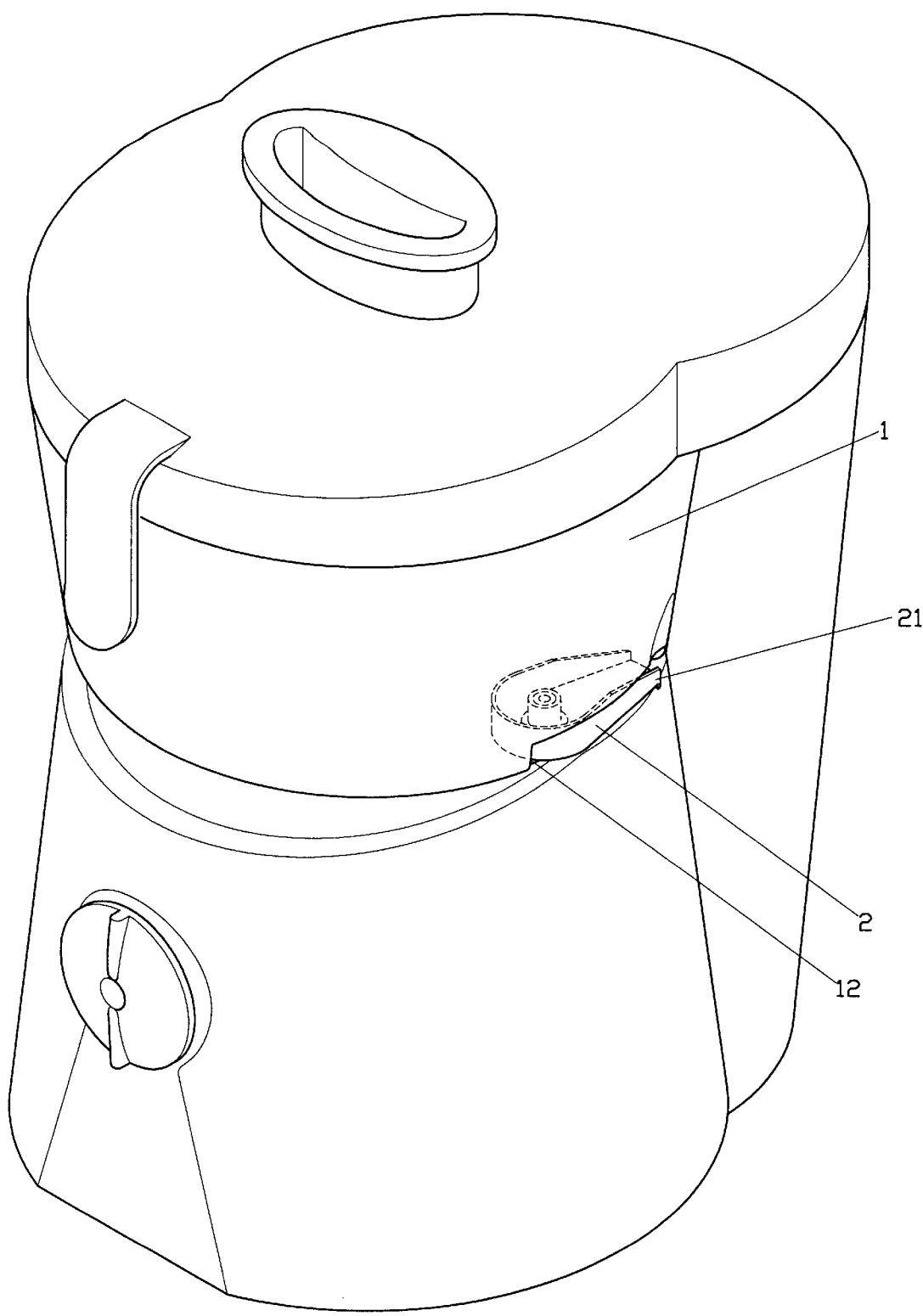
FIG. 4 is a view showing operation of the tray of the present invention.

As shown in FIG. 4, when the juice maker is not in use, the tray 2 may be pivoted into the recess 12 of the jar 1, and the tray 2 may be pivoted outwardly from the recess 12 to drain the juice in the jar 1, as shown in FIGS. 2 and 3.

As described above, when the juice maker of the present invention is not in use, the tray 2 may be hidden in the juice maker, then the opening 21 of the tray 2 will not exposure outside, that will not attract fly and cause sanitary problem when not in use.

I claim:

1. A juice maker comprising a jar and a tray at a bottom portion of said jar, said tray comprising an opening at one end, and is characterized in that:

said jar comprising a recess at one side, a hole at a bottom portion close to said recess, an axle adjacent to said hole;

said tray comprising an opening at one end and a sleeve at the other end opposing to said opening, the opposing end with respect to said opening of said tray being attached closely to said hole.

2. The juice maker, as recited in claim 1, wherein said hole of said jar is in an arcuate shape, and an axle is at a center of said arcuate hole.

3. The juice maker, as recited in claim 1, wherein said tray comprises a sleeve to be sleeved connection with said axle of said jar and secured by a fastener.

4. The juice maker, as recited in claim 3, wherein said fastener is a screw.

* * * * *